United States Patent
Lundgreen et al.

(10) Patent No.: US 7,811,210 B1
(45) Date of Patent: Oct. 12, 2010

(54) CRANK ASSEMBLY FOR FITNESS EQUIPMENT

(75) Inventors: Kenneth C. Lundgreen, Algonquin, IL (US); Laszlo Ujvari, Szucsi (HU); Patrick A. Tibbits, Madison, AL (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 12/145,602

(22) Filed: Jun. 25, 2008

(51) Int. Cl.
*A63B 22/03* (2006.01)
*B62M 3/00* (2006.01)
(52) U.S. Cl. .................. 482/57; 74/594.1; 74/594.2
(58) Field of Classification Search ............ 482/57–65; 74/594.1–594.2
See application file for complete search history.

(56) References Cited

U.S. PATENT DOCUMENTS

| | | | | |
|---|---|---|---|---|
| 3,782,841 A | * | 1/1974 | Winckelhaus | 403/373 |
| 3,899,257 A | * | 8/1975 | Gladieux | 403/259 |
| 5,961,219 A | * | 10/1999 | Maughan | 384/220 |
| 6,116,114 A | * | 9/2000 | Edwards | 74/594.1 |
| 7,267,030 B2 | * | 9/2007 | French | 74/594.1 |
| 7,523,684 B2 | * | 4/2009 | French | 74/594.1 |
| 7,523,685 B2 | * | 4/2009 | French | 74/594.1 |

\* cited by examiner

*Primary Examiner*—Steve R Crow
(74) *Attorney, Agent, or Firm*—Andrus, Sceales, Starke & Sawall, LLP

(57) ABSTRACT

A crank assembly for fitness equipment includes a ductile spacer engaged between a crankshaft mounting surface and a crank arm mounting surface at the interface thereof and conforming respectively to each to maximize surface contact area to distribute loads across a larger area.

5 Claims, 3 Drawing Sheets

CRANK ASSEMBLY FOR FITNESS EQUIPMENT

BACKGROUND AND SUMMARY

The invention relates to exercise fitness equipment, and more particularly to a crank assembly therefor.

The joint between a crank arm and a crankshaft is one of the most important joints on a piece of fitness equipment. On an upright stationary bike, for example, this joint supports the loads generated by the exercise and the user's body weight. The crank arm may be mounted to the crankshaft along a tapered square. The crank arm is typically steel or aluminum, and the crankshaft is typically steel. Assembly and disassembly of the parts reveal markings, which indicate less than optimal surface contact.

The present invention arose during continuing development efforts in the above technology and provides a simple, economical system for maximizing surface contact between the crank arm and the crankshaft, distributing the loads across a large area.

DETAILED DESCRIPTION

Figure 1:
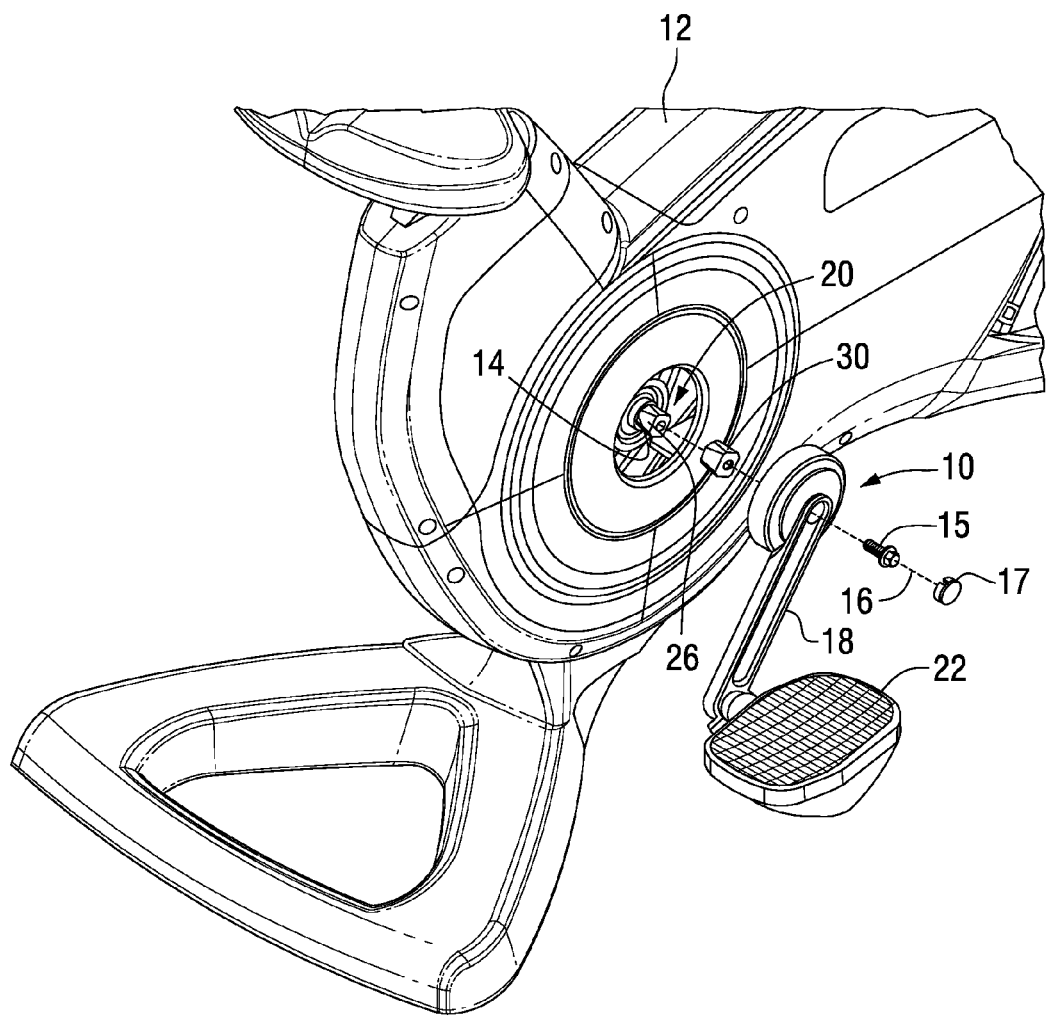
FIG. 1 is a perspective view, partially exploded, of a portion of a piece of fitness equipment such as a stationary bike.

FIG. 1 shows a crank assembly 10 for fitness equipment 12, such as a stationary bike or other exercise equipment. The crank assembly includes a crankshaft 14, FIGS. 2-4, extending along an axis 16 and rotational about the axis. The crank assembly includes a crank arm 18 mounted to crankshaft 14 at a keyed interface 20 and extending radially therefrom relative to axis 16. The crank arm is mounted to the crankshaft by a threaded bolt 15, which may be covered at its head by a protective and/or decorative cap 17. In one embodiment, such as a stationary bike, a pedal 22 is mounted at the end of crank arm 18 in journaled rotational relation for engagement by the foot of the user. The crankshaft has an opposite end with a keyed interface 24 for engaging an opposite crank arm and pedal, not shown.

Figure 2:
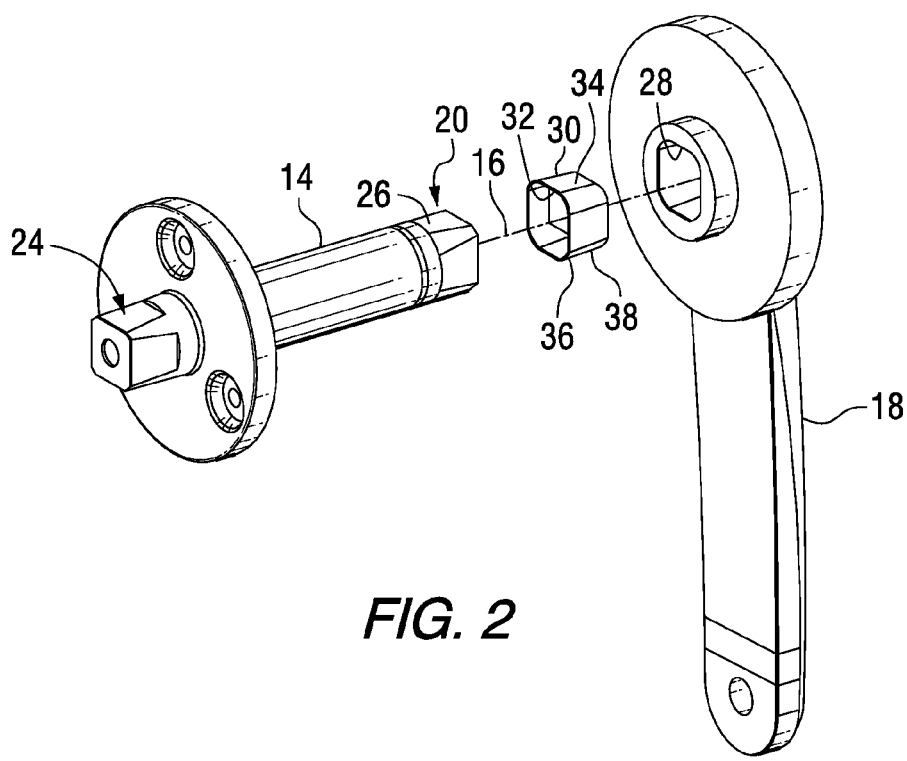
FIG. 2 is an exploded perspective view of a portion of the apparatus of FIG. 1.
Figure 3:
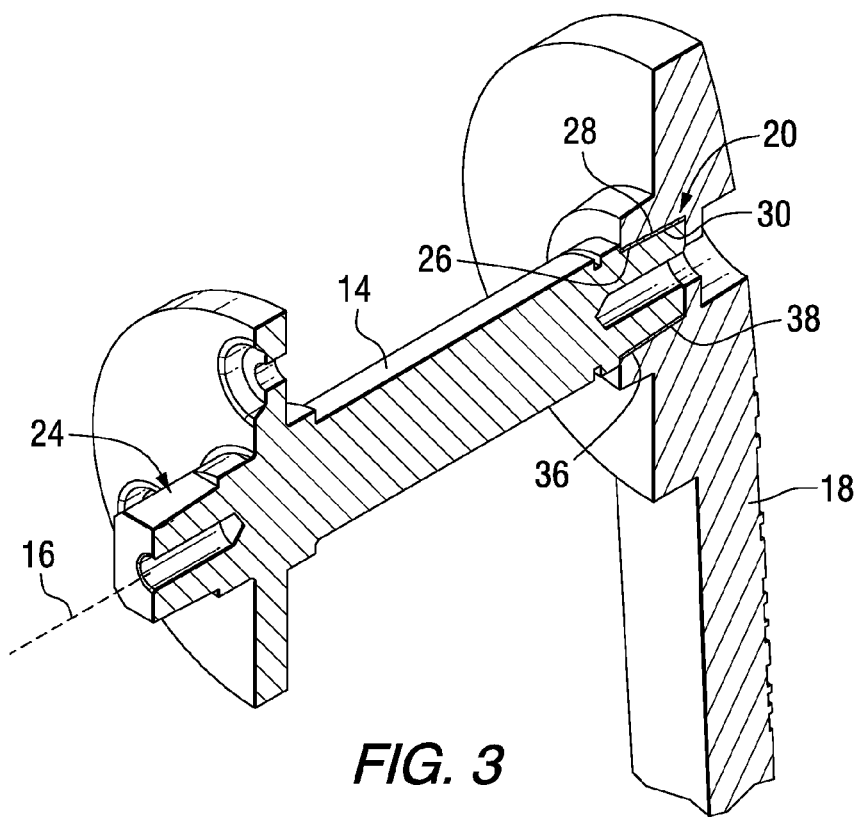
FIG. 3 is an assembly view of the components of FIG. 2, partially in section.

Crankshaft 14 and crank arm 18 each have a mounting surface 26 and 28, respectively, FIG. 2, facing each other at interface 20. A ductile spacer 30 is engaged between crankshaft mounting surface 26 and crank arm mounting surface 28 at interface 20. Ductile spacer 30 has distally opposite facing surfaces, namely a first facing surface 32 facing and engaging crankshaft mounting surface 26, and a second facing surface 34 facing and engaging crank arm mounting surface 28. Ductile spacer 30 is of a constituent material softer than at least one of mounting surfaces 26 and 28. In the preferred embodiment, the constituent material of ductile spacer 30 is softer and more malleable than both of the mounting surfaces 26 and 28, such that first facing surface 32 conforms to crankshaft mounting surface 26 and maximizes surface contact area therewith, and such that second facing surface 34 conforms to crank arm mounting surface 28 and maximizes surface contact area therewith. In one embodiment, and as is typical, crankshaft 14 is steel, and crank arm 18 is steel or aluminum. In one preferred embodiment, ductile spacer 30 is copper.

Figure 4:
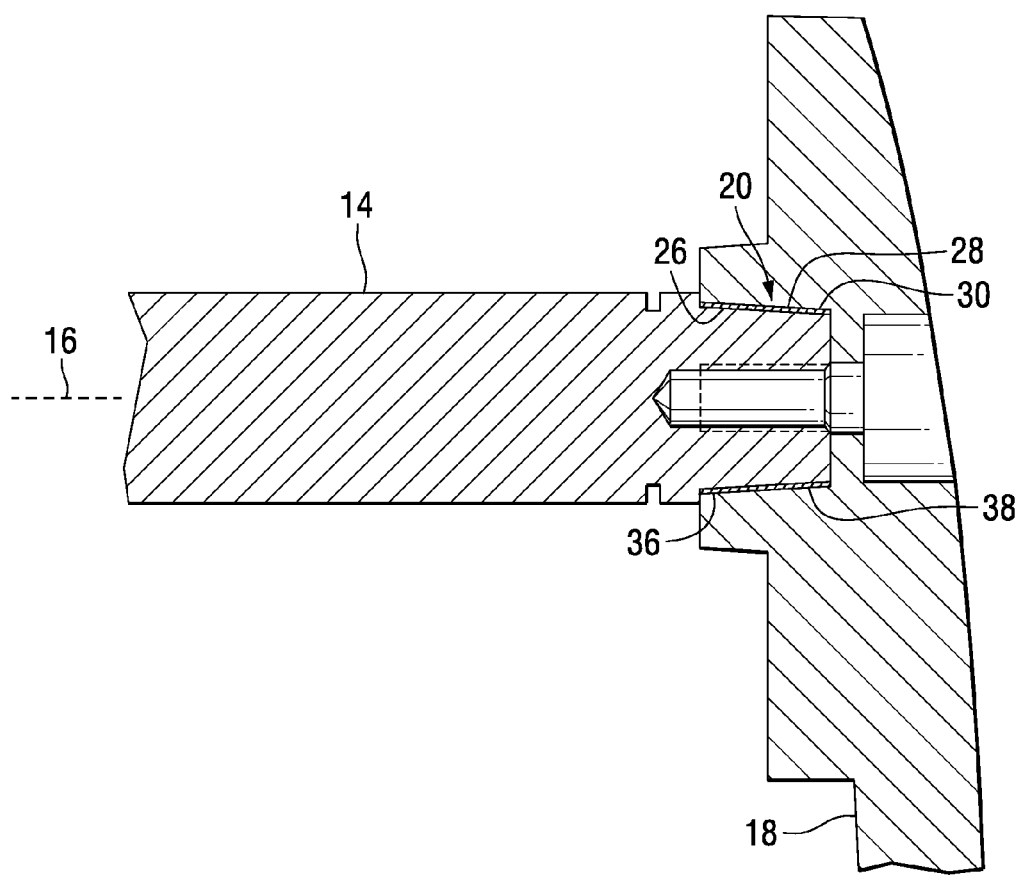
FIG. 4 is a side sectional view of a portion of the structure of FIG. 3.

Ductile spacer 30 has a keyed cross-sectional shape along a cross-sectional plane taken transversely to axis 16. In FIG. 4, the noted cross-sectional plane extends into and out of the page. The noted keyed cross-sectional shape of ductile spacer 30 preferably has at least one straight side. Further in the preferred embodiment, ductile spacer 30 extends axially along axis 16 and is frustoconically tapered relative to axis 16. Crankshaft 14 extends axially away from keyed interface 20 along a first axial direction, e.g. leftwardly in FIGS. 2-4. Frustoconically tapered ductile spacer 30 has first and second perimeters 36 and 38. First perimeter 36 is larger than second perimeter 38. First perimeter 36 is axially spaced from second perimeter 38 along the noted first axial direction, i.e. larger perimeter 36 is spaced axially leftwardly of smaller perimeter 38 in FIGS. 2-4.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A crank assembly for fitness equipment comprising a crankshaft extending axially along an axis and rotational about said axis, a crank arm mounted to said crankshaft at a keyed interface and extending radially therefrom relative to said axis, said crankshaft and said crank arm each having a mounting surface facing each other at said interface, a ductile spacer engaged between said crankshaft mounting surface and said crank arm mounting surface at said interface, wherein said ductile spacer has distally opposite facing surfaces, namely a first facing surface facing and engaging said crankshaft mounting surface, and a second facing surface facing and engaging said crank arm mounting surface, and wherein said ductile spacer is of a constituent material softer than at least one of said mounting surfaces, said ductile spacer having a nonsplit continuous perimeter therearound in a plane normal to said axis, wherein:
said constituent material of said ductile spacer is softer and more malleable than both of said mounting surfaces;
said first facing surface conforms to said crankshaft mounting surface and maximizes surface contact area therewith;
said second facing surface conforms to said crank arm mounting surface and maximizes surface contact area therewith;
said ductile spacer has a keyed cross-sectional shape along a cross-sectional plane taken transversely to said axis;
said ductile spacer extends axially along said axis and is frustoconically tapered relative to said axis.

2. The crank assembly for fitness equipment according to claim 1 wherein said crankshaft is steel, and said crank arm is selected from the group consisting of steel and aluminum.

3. The crank assembly for fitness equipment according to claim 2 wherein said ductile spacer is copper.

4. The crank assembly for fitness equipment according to claim 1 wherein said shape comprises at least one straight side.

5. The crank assembly for fitness equipment according to claim 1 wherein:

said crankshaft and said crank arm meet at said keyed interface, and said crankshaft extends axially away from said keyed interface along a first axial direction;

said frustoconically tapered ductile spacer has first and second perimeters, said first perimeter being larger than said second perimeter, said first perimeter being axially spaced from said second perimeter along said first axial direction.

* * * * *